(12) United States Patent
Kordahi et al.

(10) Patent No.: US 6,584,253 B2
(45) Date of Patent: Jun. 24, 2003

(54) SEALED CABLE CONNECTION

(75) Inventors: Maurice Kordahi, Atlantic Highlands, NJ (US); David Giordano, Barnegat, NJ (US); Robert Stix, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/776,081

(22) Filed: Feb. 2, 2001

(65) Prior Publication Data

US 2002/0106168 A1 Aug. 8, 2002

(51) Int. Cl.[7] ................................................. G02B 6/44
(52) U.S. Cl. .......................... 385/100; 385/99; 385/59; 385/71; 174/93; 174/73.1
(58) Field of Search ............................ 385/99, 100, 59, 385/71; 174/93, 73.1

(56) References Cited

U.S. PATENT DOCUMENTS

| 4,717,792 A | * | 1/1988 | Sterritt et al. ............. 174/88 C |
| 4,773,729 A | | 9/1988 | Mignien ..................... 350/96.21 |
| 6,028,974 A | | 2/2000 | Shyu et al. ..................... 385/100 |

FOREIGN PATENT DOCUMENTS

EP 0 235 891 9/1987 .......... H02G/15/04

* cited by examiner

*Primary Examiner*—Hemang Sanghavi
*Assistant Examiner*—Scott A Knauss

(57) ABSTRACT

Sealed cable connections can be used to connect first and second cables to a sealed cable joint. The sealed cable connection at one end of the sealed cable joint includes a cable socket body positioned within an inner region of a housing. The cable socket body includes a passageway receiving one of the cables. A seal securing member is positioned within the inner region of the housing and secured into contact with the cable socket body. At least one seal, such as a resilient metal seal, is compressed between the cable socket body and the seal securing member to seal against the inner surface of the housing. The sealed cable connection can also include a cable seal positioned around the cable and within the passageway of the cable socket body.

29 Claims, 4 Drawing Sheets

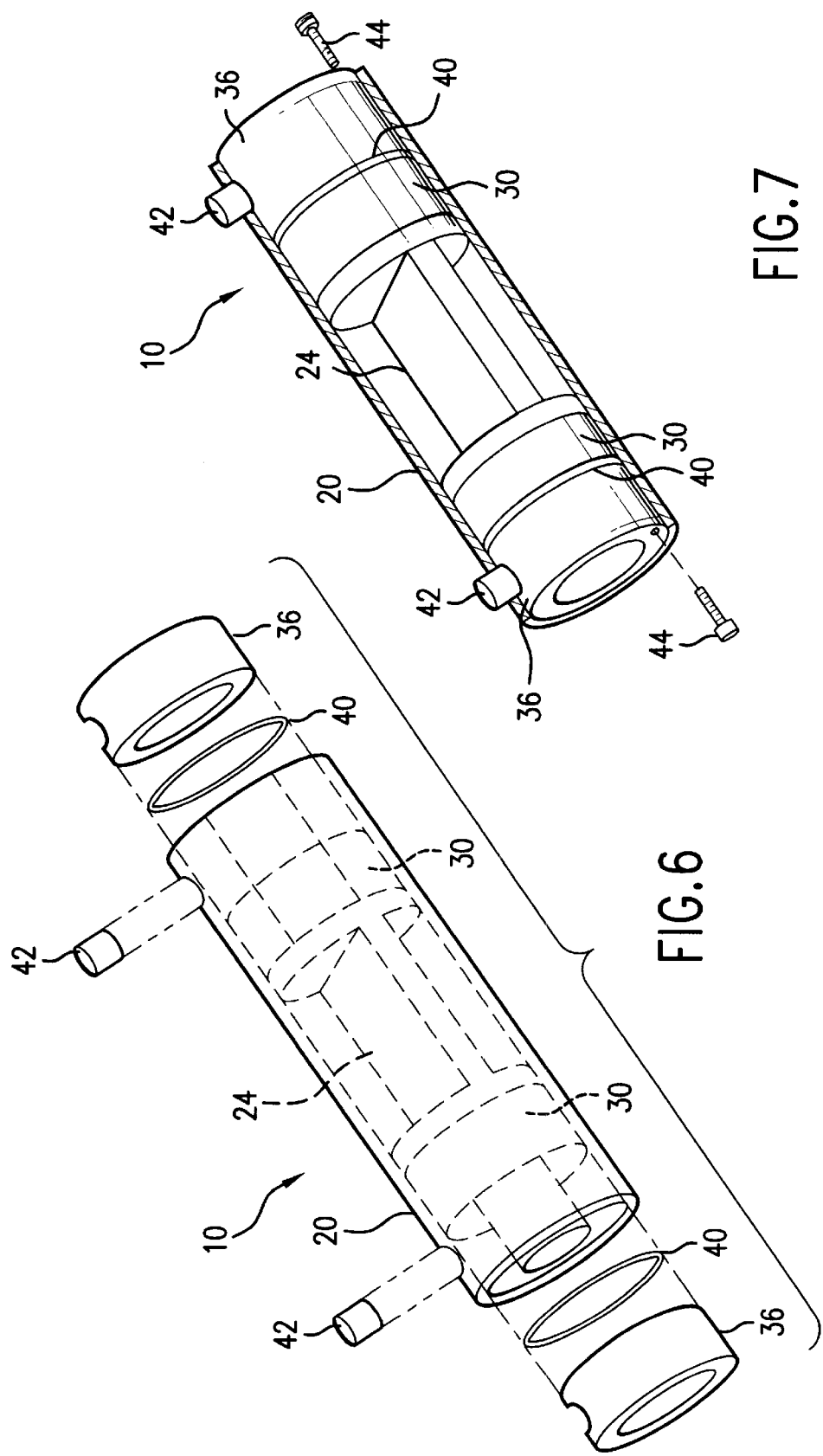

SEALED CABLE CONNECTION

CROSS-REFERENCE TO RELATED APPLICATION

The present application is related to application Ser. No. 09/776,060 entitled SYSTEM FOR STORING SPLICES IN A JOINT BOX, which is commonly owned and fully incorporated herein by reference.

TECHNICAL FIELD

The present invention relates to cable connections and more particularly to a sealed cable joint for joining fiber optic cables.

BACKGROUND INFORMATION

Fiber optic cables are deployed across many miles of ocean and other large bodies of water to establish communication networks. Because these fiber optic cables cannot be made and deployed in infinite length, sections of the cables must be attached together to extend across large distances. Cable joints are used to connect fiber optic cables together, for example, when splicing the optical fibers. Although the cable joints are designed to protect the optical fibers and splice connection in a high-pressure, underwater environment, there are a number of cases where additional protection is needed.

In one case, hydrogen may enter the cable joint and adversely affect the optical fibers exposed within the cable joint. The hydrogen is generated near the cable joint from galvanic corrosion of metal parts, magnetohydrodynamic effects, and microbial activity near the connection of the cable with the cable joint. The hydrogen causes optical loss in the optical fiber, which is known in the art as hydrogen induced attenuation. If hydrogen penetrates a significant distance along the optical fibers, then the hydrogen causes a significant amount of hydrogen induced attenuation in the optical fiber.

Previous attempts at sealing cable joints have resulted in seals around every nut and bolt used in the cable joint. Although these existing cable joints may be sealed against water penetration, these cable joints generally are not adequately sealed against the penetration of hydrogen.

One type of seal used in an underwater cable joint to seal against the penetration of hydrogen is disclosed in U.S. Pat. No. 6,028,974. This cable joint includes a casing 130, an anchorage 120, a casing loading ring 150, and an anchorage loading ring 145. A seal ring 140 is positioned between the casing 130 and anchorage 120 and the respective casing loading ring 150 and anchorage loading ring 145. The purpose of the seal ring 140 is to prevent hydrogen from entering the cable junction.

The arrangement disclosed in U.S. Pat. No. 6,028,974, however, has some drawbacks. First, a large amount of force is required to install the seal ring 140. The casing 130 and the anchorage 120 have respective circular ridges 260, 263 for embedding into the seal ring 140. U.S. Pat. No. 6,028,974 discloses an embodiment of the cable junction 100 for an optical fiber cable 110 having a diameter of 14 mm which will require a load of approximately 180 kN to properly embed the circular ridges 260, 263 having sharp leading edges 265, 267 in the seal ring 140. To properly apply this force, it may be necessary to apply an external load with a press machine to embed the circular ridges 260, 263 into the seal ring 140 before tightening the loading rings 145, 150. This additional pressing step and the required force can make assembly of this cable joint difficult. Also, the seal ring 140 is positioned in a gap between the casing 130 and loading ring 150 and is exposed to the outside of the casing 130. Thus, this seal ring 140 may be susceptible to failure.

Accordingly, there is a need for a sealed cable joint that is easier to assemble and stronger than existing seals.

SUMMARY OF THE INVENTION

In accordance with one aspect of the present invention, a sealed cable joint connects first and second cables. The sealed cable joint comprises a housing having first and second ends and an inner surface defining an inner region. First and second cable socket bodies are positioned within the inner region of the housing at the first and second ends of the housing. Each of the first and second cable socket bodies includes a passageway receiving respective cables. First and second seal securing members are positioned within the inner region of the housing at the first and second ends of the housing and are secured into contact with the respective socket bodies.

The sealed cable joint also comprises a first seal positioned against the inner surface of the housing at an interface between the first cable socket body and the first seal securing member. A second seal is positioned against the inner surface of the housing at an interface between the second cable socket body and the second seal securing member. The first and second seals are compressed between the respective first and second seal securing members and the respective first and second cable socket bodies for sealing against the housing.

According to one embodiment, each of the cable socket bodies includes a seating portion and a radial portion extending radially from the seating portion. The seal securing members are seated on the seating portion and against the radial portion of the respective cable socket bodies. The radial portion of each of the cable socket bodies includes an outer groove holding the respective seals. In this embodiment, the seal securing member is preferably secured to the housing.

According to another embodiment, each of the seal securing members is secured against an end face of the respective cable socket bodies. The seal securing members preferably include an outer groove holding the respective seals. The sealed cable joint according to this embodiment preferably further comprises at least first and second inner seals. Each of the seal securing members includes an inner groove spaced radially inwardly from the outer groove to hold the respective inner seals. In this embodiment, the socket bodies are preferably secured to the housing.

The preferred embodiment of the seal includes an annular helically-wound spring and at least one lining around the helically-wound spring. According to one preferred embodiment, the sealed cable joint further comprises first and second cable seals positioned around the respective cables and within the passageways in the respective cable socket bodies. The cable seals preferably have an outer conical shape.

In accordance with a further aspect of the present invention, a sealed cable connection is provided comprising a fiber optic cable including at least one optical fiber and at least one protective outer layer and a housing having an inner surface defining an inner region. At least one cable socket body is positioned within the inner region of the housing and includes a passageway receiving the fiber optic cable. At least one seal securing member is positioned within the inner region of the housing and is secured into contact with the socket body. At least one seal is positioned against the inner surface of the housing and between the cable socket body and the seal securing member. The sealed cable connection can be provided as an assembly.

In accordance with a further aspect of the present invention, a cable connection pre-assembly is provided comprising at least one cable socket body including a passageway for receiving a cable. At least one seal securing member is loosely secured to the cable socket body, and at least one seal is positioned between the cable socket body and the seal securing member.

In accordance with yet another aspect of the present invention, a method is provided for sealing a cable joint. The method comprises inserting at least one seal between a seal securing member and a cable socket body and loosely securing the seal securing member to the cable socket body with the seal positioned therebetween, thereby forming a pre-assembly. The pre-assembly is inserted into and secured to a housing, and a cable is secured to the cable socket body. The seal securing member is tightened against the cable socket body to compress the seal against an inside surface of the housing.

BRIEF DESCRIPTION OF THE DRAWINGS

These and other features and advantages of the present invention will be better understood by reading the following detailed description, taken together with the drawings wherein:

FIG. 6 is a schematic, exploded view of the sealed cable joint being assembled, according to one method; and FIG. 7 is a schematic, partially cross-sectional view of the sealed cable joint shown in FIG. 6, being assembled.

DETAILED DESCRIPTION OF THE PREFERRED EMBODIMENTS

Figure 1:
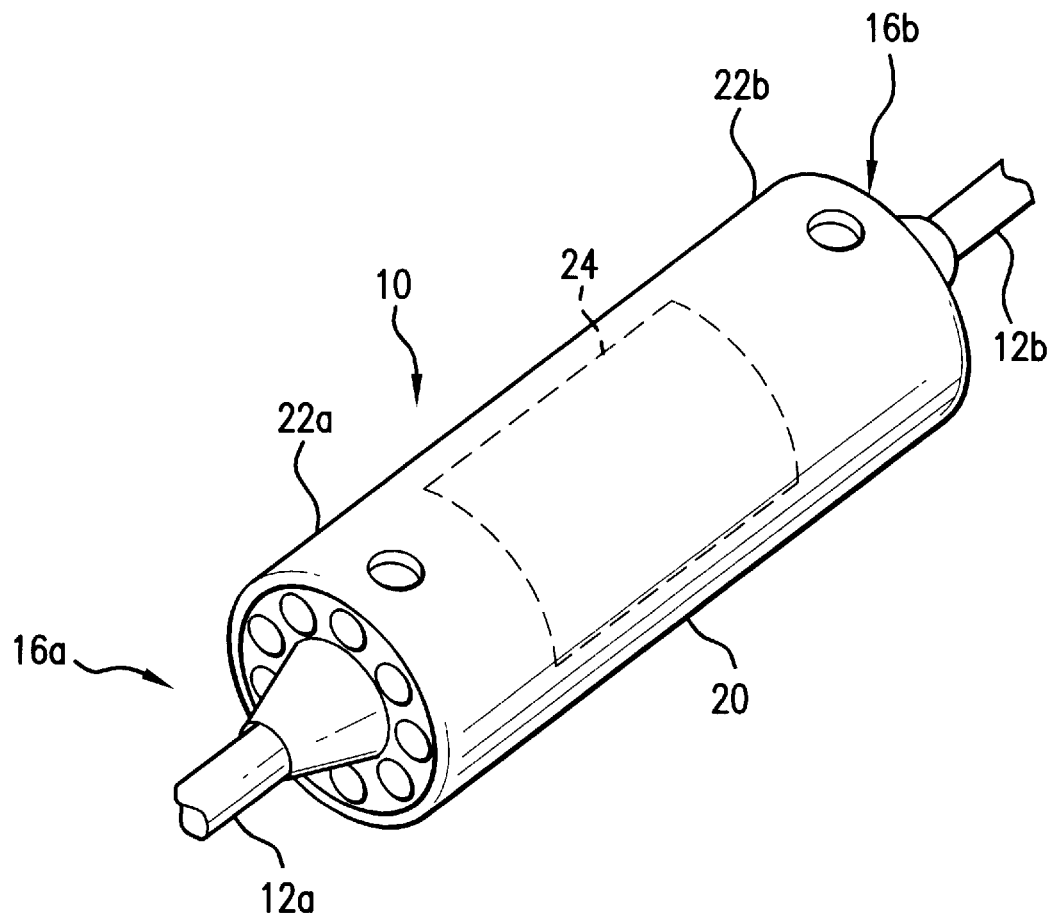
FIG. 1 is a perspective view of a sealed cable joint, according to the present invention.

A sealed cable joint 10, FIG. 1, according to the present invention, is used to connect two cables 12a, 12b underwater. The sealed cable joint 10 includes a housing 20 and first and second sealed cable connections 16a, 16b connecting the cables 12a, 12b to the housing 20 at first and second ends 22a, 22b of the housing 20. The cable joint 10 also includes a shelf or center section 24 located within the housing 20. The sealed cable connections 16a, 16b are sealed against the housing 20 from the inside, as will be described in greater detail below. In the exemplary embodiment, the cables 12a, 12b are fiber optic cables that are spliced at the center section 24, and the sealed cable joint 10 prevents hydrogen from entering into the sealed cable joint 10 and adversely affecting the optical fibers exposed within the cable joint 10. The concepts of the present invention can also be used in connecting other types of cables and to substantially prevent other types of gases or fluids from entering or escaping.

Figure 2:
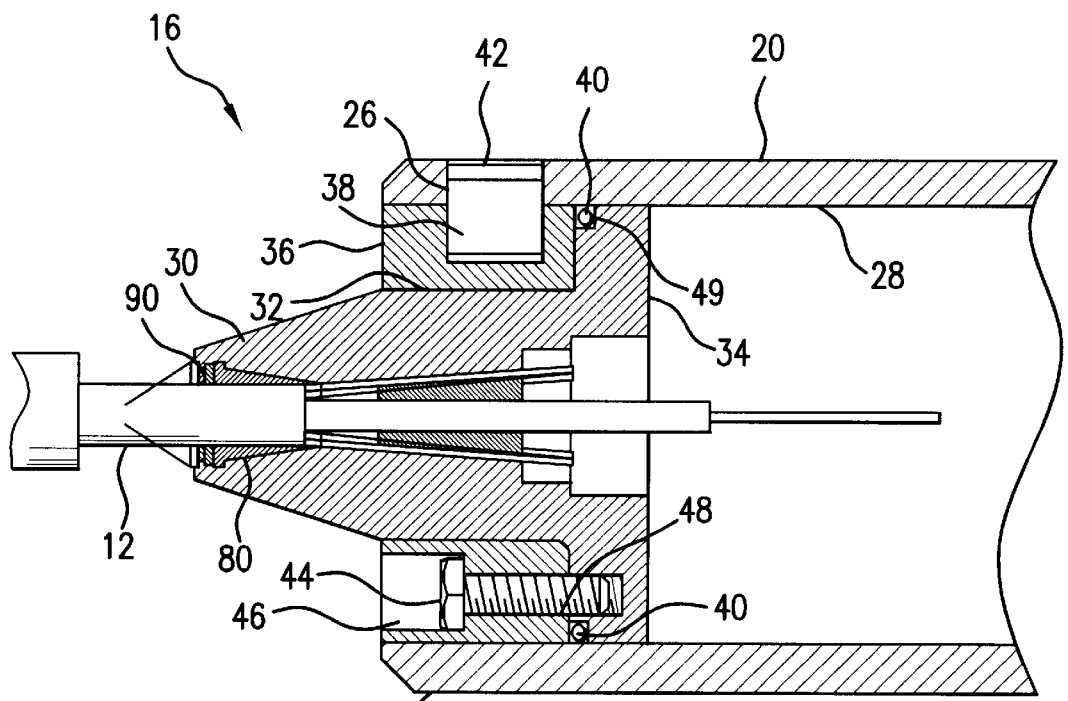
FIG. 2 is a cross-sectional view of a sealed cable connection, according to one embodiment of the present invention.

According to one embodiment, the sealed cable connection 16, FIG. 2, includes a cable socket body 30 located within the housing 20 at one end 22. The cable socket body 30 includes a seating portion 32 and a radial portion 34 extending radially from the seating portion 32. The cable 12 can be connected to the cable socket body 30 using any known cable termination arrangement. A generally ring-shaped seal securing member 36 is seated on the seating portion 32 and extends around the cable socket body 30. A generally ring-shaped seal 40 is positioned against the inner surface 28 of the housing 20 and between the radial portion 34 of the cable socket body 30 and the seal securing member 36.

According to this embodiment, the seal securing member 36 is secured to the housing 20, for example, using pins 42. The pins 42 preferably extend through radial apertures 26 in the housing 20 and into radial cavities 38 within the seal securing member 36. The cable socket body 30 is secured to the seal securing member 36, for example, using torque bolts 44. The torque bolts 44 preferably extend through longitudinal apertures 46 in the seal securing member 36 and are threaded into threaded cavities 48 within the socket body 30. In the exemplary embodiment, while only one torque bolt is shown in FIG. 2, preferably nine torque bolts are circumferentially spaced around the seal securing members 36. The seal 40 is thus compressed between the cable socket body 30 and the seal securing member 36 and sealed against the inner surface 28 of the housing 20.

The exemplary embodiment shows a groove 49 within the radial portion 34 of the socket body 30 that receives the seal 40. Alternatively, the seal 40 can be seated in a groove in the seal securing member 36 or within matching grooves in both the radial portion 34 and the seal securing member 36 (not shown).

Figure 3:
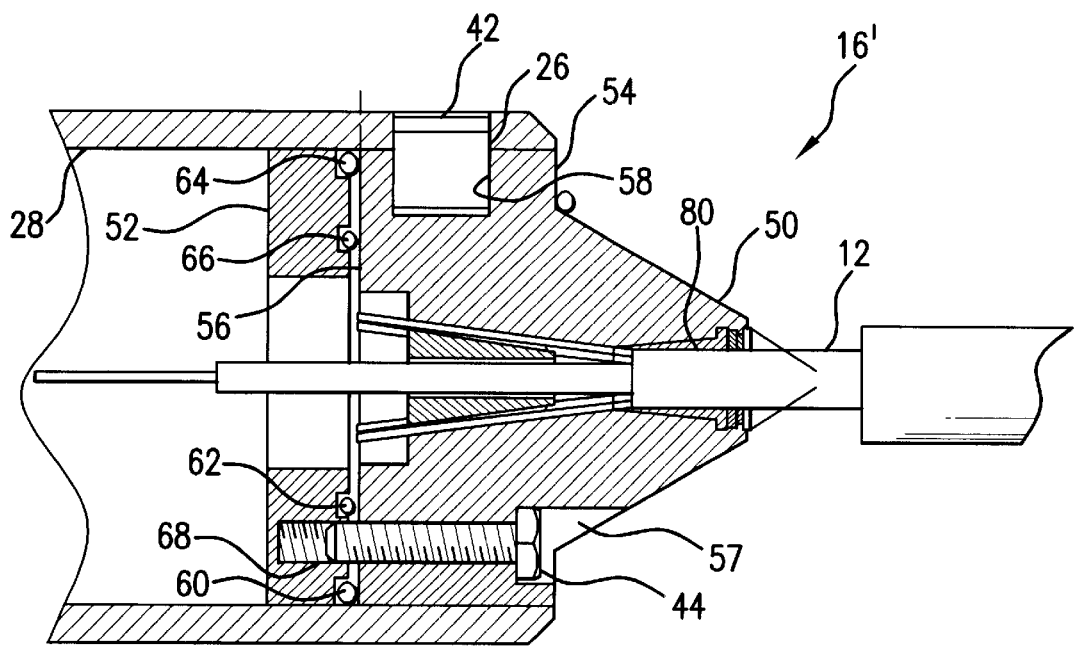
FIG. 3 is a cross-sectional view of a sealed cable connection, according to another embodiment of the present invention.

According to another embodiment, the sealed cable connection 16', FIG. 3, includes a socket body 50 located within the housing 20 at one end 22. The socket body 50 includes a housing engaging portion 54 that engages the inner surface 28 of the housing 20. The cable 12 can be connected to the cable socket body 50 using any known cable termination arrangement. One or more seals 60, 62 are positioned between a seal securing member 52 and an end face 56 of the socket body 50.

In this embodiment, an outer seal 60 is positioned against the housing inner surface 28 and between the seal securing member 52 and the socket body 50. An inner seal 62 is positioned between the seal securing member 52 and the end face 56 of the housing engaging portion 54 and is spaced radially inwardly from the outer seal 60. The outer and inner seals 60, 62 are seated in outer and inner grooves 64, 66 respectively, within the seal securing member 52. Alternatively, grooves can be located in the end face 56 of the socket body 50 (not shown).

In this embodiment, the housing engaging portion 54 is secured to the housing 20, for example, using pins 42 extending through radial apertures 26 in the housing 20 into radial cavities 58 in the socket body 50. To secure the seal securing member 52 to the socket body 50, torque bolts 44 extend through longitudinal cavities 57 in the socket body 50 and into threaded cavities 68 in the seal securing member 52.

FIG. 3 shows the sealed cable connection 50 before compression of the seals 60, 62 where the seal securing member 52 is loosely secured to the socket body. One advantage of the present invention is the ability to pre-assemble the socket body 50, the seal securing member 52, and the seals 60, 62 without actually sealing the assembly. The pre-assembly can be inserted into the housing 20 as a single unit, simplifying the overall assembly. When the torque bolts 44 are tightened, the seal securing member 52 is pulled against the end face 56 of the socket body 50 and the seals 60, 62 are compressed. The embodiment shown in FIG. 2 can also be assembled in this way.

Figure 4:
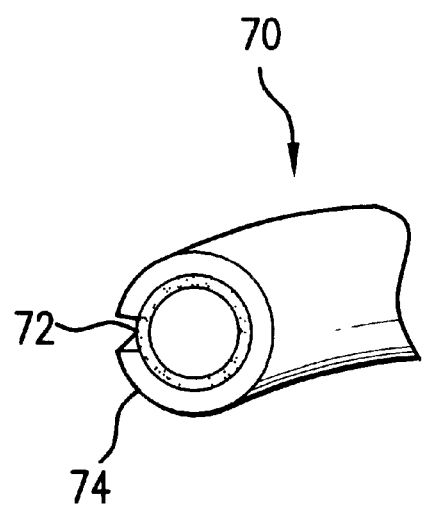
FIG. 4 is a cross-sectional view of a seal, according to one embodiment of the present invention.

One preferred embodiment of the seal 40, 60, 62 is a resilient metal seal 70, FIG. 4. The exemplary embodiment of the resilient metal seal 70 comprises a helically wound spring 72 with one or more metal linings 74 formed at least partially around the toroidal section of the spring 72. The metal lining 74 is preferably made of a malleable metal, such as copper, silver, aluminum, or other suitable materials. Although the exemplary embodiment shows a resilient metal seal having a particular shape and design, any type of seal made of any type of sealing material can be used.

Figure 5:
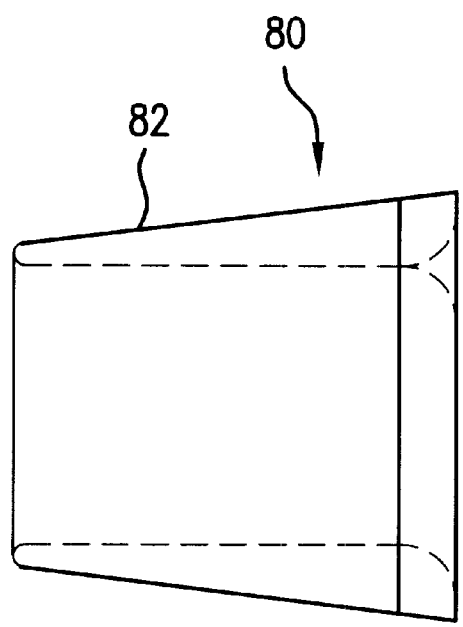
FIG. 5 is a side view of a cable seal used in the sealed cable joint, according to one embodiment of the present invention.

In one preferred embodiment, each of the sealed cable connections 16, 16' includes a cable seal 80 positioned around the cable 12 and within passageways in the cable socket bodies 30, 50. Each cable seal 80, FIG. 5, preferably has an outer conical surface 82 that matches a conical surface within the passageway in the cable socket body 30, 50. The cable seal 80 is preferably made of copper, although other suitable sealing materials can also be used. The cable seal 80 is pressed into place, for example, using a powered press, and secured with a threaded retaining ring 90 (FIG. 2). The cable seal 80 is preferably plastically deformed around the cable 12.

Referring to FIGS. 6 and 7, one method of assembling the sealed cable joint 10 using the sealed cable connection 16 is described. First, the shelf or center section 24 and cable socket bodies 30 are inserted into the housing 20. The seals 40 are then inserted over one end of the socket bodies 30 and into engagement with the radial portion 34 of the socket bodies 30. Seal securing members 36 are then inserted over the cable socket bodies 30 and positioned against the seals 40. The pins 42 are inserted through the housing 20 and into engagement with the seal securing members 36, securing the rings 36 within the housing 20. Torque bolts 44 are then inserted through the seal securing members 36 and into the radial portions 34 of the socket bodies 30 (FIG. 6). When the torque bolts 44 are tightened, the cable socket bodies 30 and the seal securing members 36 are pulled together, thereby compressing the seals 40 and effecting a seal against the inside surface of the housing 20.

According to another method, the socket body 30, the seal securing member 36, and the seal 40 are pre-assembled and loosely secured together with the torque bolts 44. This pre-assembly is then inserted as a single unit into the housing 10 and the seal securing member 36 is secured to the housing 20 with the pins 42. The torque bolts 44 can then be tightened to effect the seal.

Accordingly, the sealed cable connections of the present invention create a seal between the cable and the inside of the socket body. Modifications and substitutions by one of ordinary skill in the art are considered to be within the scope of the present invention which is not to be limited except by the claims which follow.

What is claimed is:

1. A sealed cable joint for connecting first and second cables, said sealed cable joint comprising:
   a housing having first and second ends and an inner surface defining an inner region;
   first and second cable socket bodies positioned within said inner region of said housing at said first and second ends of said housing, each of said first and second cable socket bodies including a passageway receiving a respective one of said first and second cables;
   first and second seal securing members positioned within said inner region of said housing at said first and second ends of said housing and secured into contact with respective said first and second socket bodies; and
   at least first and second seals, said first seal being positioned continuously and with substantially an entire length of said seal against said inner surface of said housing at an interface between said first cable socket body and said first seal securing member, said second seal being positioned continuously against said inner surface of said housing at an interface between said second cable socket body and said second seal securing member, wherein said first and second seals are compressed between said first and second seal securing members and said first and second cable socket bodies, respectively, for sealing against said inner surface of said housing.

2. The sealed cable joint of claim 1 further comprising first and second cable seals positioned around respective said first and second cables and within said passageways in respective said first and second cable socket bodies.

3. The sealed cable joint of claim 2 wherein said cable seals each have an outer conical shape.

4. The sealed cable joint of claim 1 wherein each of said seals includes a resilient metal seal.

5. The sealed cable joint of claim 1 wherein each of said seals includes an annular helically-wound spring and at least one lining at least partially around said annular helically-wound spring.

6. The sealed cable joint of claim 5 wherein said lining is made of copper.

7. The sealed cable joint of claim 1 wherein said seal securing members are secured to said cable socket bodies with at least one torque bolt.

8. The sealed cable joint of claim 1 wherein each of said cable socket bodies includes a seating portion and a radial portion extending radially from said seating portion, wherein said first and second seal securing members are seated on said seating portion and against said radial portion of respective said first and second cable socket bodies.

9. The sealed cable joint of claim 8 wherein said radial portion of each of said first and second cable socket bodies includes an outer groove holding respective said first and second seals.

10. The sealed cable joint of claim 8 wherein said seal securing member is secured to said housing.

11. The sealed cable joint of claim 1 wherein each of said seal securing members is secured against an end face of respective said cable socket bodies.

12. The sealed cable joint of claim 11 wherein each of said first and second seal securing members includes an outer groove holding respective said first and second seals.

13. The sealed cable joint of claim 12 further comprising at least first and second inner seals, wherein each of said first and second seal securing members includes an inner groove spaced radially inwardly from said outer groove, and wherein said inner groove of each of said seal securing members holds respective said first and second inner seals.

14. The sealed cable joint of claim 11 wherein said socket bodies are secured to said housing.

15. A sealed cable connection assembly comprising:
   a housing having at least one end and an inner surface defining an inner region;
   at least one cable socket body being positioned within said inner region of said housing at said end of said housing, said cable socket body including a passageway for receiving a cable;

at least one seal securing member being positioned within said inner region of said housing at said end of said housing and secured into contact with said socket body; and at least one seal being positioned continuously and with substantially an entire length of said seal against said inner surface of said housing and between said cable socket body and said seal securing member.

16. The sealed cable connection assembly of claim 15 further comprising at least one cable seal adapted to be positioned around respective said cable and within said passageway in said cable socket body.

17. A sealed cable connection comprising:

a fiber optic cable including at least one optical fiber and at least one protective outer layer;

a housing having an inner surface defining an inner region;

at least one cable socket body positioned within said inner region of said housing, said cable socket body including a passageway receiving said fiber optic cable;

at least one seal securing member positioned within said inner region of said housing and secured into contact with said socket body; and at least one seal positioned continuously and with substantially an entire length of said seal against said inner surface of said housing and between said cable socket body and said seal securing member, for sealing against said inner surface of said housing.

18. The sealed cable connection of claim 17 further comprising at least one cable seal positioned around said cable and within said passageway in said socket body.

19. The sealed cable connection of claim 18 wherein said cable seal has an outer conical shape.

20. The sealed cable connection of claim 17 further including at least one inner seal between said cable socket body and said seal securing member.

21. A cable connection pre-assembly comprising:

at least one cable socket body including a passageway for receiving a cable;

at least one seal securing member loosely secured to said cable socket body;

at least one outer seal positioned between said cable socket body and said seal securing member and proximate an outer surface of said cable socket body and said seal securing member; and at least one inner seal between said cable socket body and said seal securing member and spaced radially inwardly from said outer seal.

22. The cable connection pre-assembly of claim 21 further comprising at least one cable seal positioned within said passageway in said cable socket body.

23. The cable connection pre-assembly of claim 21 wherein said seal includes an annular helically-wound spring and at least one lining at least partially around said annular helically-wound spring.

24. The cable connection pre-assembly of claim 21 wherein said seal includes a metal resilient seal.

25. The cable connection pre-assembly of claim 21 wherein said cable socket body includes a seating portion and a radial portion extending radially from said seating portion, wherein said seal securing member is seated on said seating portion and positioned against said radial portion of said cable socket body.

26. The cable connection pre-assembly of claim 21 wherein said seal securing portion is positioned against an end face of said cable socket body.

27. A method of sealing a cable joint, said method comprising:

inserting at least one seal between a seal securing member and a cable socket body;

loosely securing said seal securing member to said cable socket body with said seal positioned therebetween, thereby forming a pre-assembly;

inserting said pre-assembly into a housing;

securing said pre-assembly to said housing;

securing a cable to said cable socket body; and tightening said seal securing member against said cable socket body to compress said seal against an inside surface of said housing.

28. The method of claim 27 further including positioning a cable seal between said cable socket body and said cable.

29. The method of claim 27 wherein the step of tightening is preformed last.

* * * * *